(12) United States Patent
Yang et al.

(10) Patent No.: US 9,553,477 B2
(45) Date of Patent: Jan. 24, 2017

(54) MOBILE COMMUNICATION TERMINAL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Ruiyong Wang, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 14/421,566

(22) PCT Filed: Jul. 25, 2014

(86) PCT No.: PCT/CN2014/083066
§ 371 (c)(1),
(2) Date: Feb. 13, 2015

(87) PCT Pub. No.: WO2015/090065
PCT Pub. Date: Jun. 25, 2015

(65) Prior Publication Data
US 2015/0349575 A1    Dec. 3, 2015

(30) Foreign Application Priority Data

Dec. 19, 2013   (CN) .......................... 2013 1 0705639

(51) Int. Cl.
H04M 1/00       (2006.01)
H04B 1/38       (2015.01)
(Continued)

(52) U.S. Cl.
CPC ................. *H02J 7/025* (2013.01); *H02J 7/32* (2013.01); *H04B 1/3883* (2013.01); *H04M 1/03* (2013.01); *H04W 88/02* (2013.01); *Y02B 40/90* (2013.01)

(58) Field of Classification Search
None
See application file for complete search history.

(56) References Cited

U.S. PATENT DOCUMENTS 7,268,517 B2 *  9/2007  Rahmel ................... H02J 17/00
                                                    320/101
7,646,863 B2 *  1/2010  Johnston .................. H02J 7/32
                                                    379/428.02
(Continued)

FOREIGN PATENT DOCUMENTS

CN         201123083 Y       9/2008
CN         201138850 Y      10/2008
(Continued)

OTHER PUBLICATIONS

Chinese Office Action of Chinese Application No. 201310705639.5, mailed Apr. 22, 2015 with English translation.
(Continued)

Primary Examiner — Tuan A Tran
(74) Attorney, Agent, or Firm — Collard & Roe, P.C.

(57) ABSTRACT

A mobile communication terminal comprises: a magnetic field unit for generating magnetic field; an induction unit comprising at least one coil; a fixed unit and a motion unit which is movable relative to the fixed unit, wherein one of the magnetic field unit and the induction unit is arranged on the fixed unit, and the other is arranged on the motion unit; and an energy storage unit electrically connected to the induction unit for storing electrical energy generated by the induction unit. The mobile communication terminal can solve the problem that existing mobile communication ter-
(Continued)

minals have large power consumption and short continuous service time. It can take full advantage of energies and have long continuous service time.

19 Claims, 2 Drawing Sheets

(51) Int. Cl.
*H02J 7/02* (2016.01)
*H04B 1/3883* (2015.01)
*H02J 7/32* (2006.01)
*H04W 88/02* (2009.01)
*H04M 1/03* (2006.01)

(56) References Cited

U.S. PATENT DOCUMENTS

| | | | | |
|---|---|---|---|---|
| 8,456,064 B2* | 6/2013 | Winger | ............... | A45C 15/00 |
| | | | | 310/339 |
| 8,577,425 B2* | 11/2013 | Kroll | ............... | H04M 1/05 |
| | | | | 320/101 |
| 2002/0122217 A1 | 9/2002 | Nakajima | | |
| 2007/0210580 A1* | 9/2007 | Roberts | ............... | F03G 7/08 |
| | | | | 290/1 R |
| 2007/0278997 A1 | 12/2007 | Chang et al. | | |
| 2009/0174361 A1* | 7/2009 | Duron | ............... | H02J 17/00 |
| | | | | 320/101 |
| 2013/0207600 A1 | 8/2013 | He | | |

FOREIGN PATENT DOCUMENTS

| | | |
|---|---|---|
| CN | 102025289 A | 4/2011 |
| CN | 102437703 A | 5/2012 |
| CN | 102610868 A | 7/2012 |
| CN | 202495868 U | 10/2012 |
| CN | 103701187 A | 4/2014 |

OTHER PUBLICATIONS

International Search Report and Written Opinion of the International Searching Authority with Notice of Transmittal of the International Search Report and Written Opinion of PCT/CN2014/083066 in Chinese, mailed Oct. 29, 2014.
English translation of the International Preliminary Report on Patentability and Written Opinion of the International Searching Authority of PCT/CN2014/083066, issued Jun. 21, 2016.

* cited by examiner

MOBILE COMMUNICATION TERMINAL

CROSS REFERENCE TO RELATED APPLICATIONS

This application is the National Stage of PCT/CN2014/083066 filed on Jul. 25, 2014, which claims priority under 35 U.S.C. §119 of Chinese Application No. 201310705639.5 filed on Dec. 19, 2013, the disclosure of which is incorporated by reference.

TECHNICAL FIELD OF THE DISCLOSURE

The present disclosure relates to a mobile communication terminal.

BACKGROUND

With the development of technologies, current mobile communication terminals (such as cell phones, tablet computers, and so on) have had very broad applications.

Because all mobile communication terminals are powered by batteries, their continuous service time is limited. When the battery is used up, it has to be charged. However, frequent charging operations disturb the user's normal usage. More seriously, if the user forgets to charge the device, the problem that the device is not usable may be caused.

In particular, with the popularization of smart phones, the above problems become more notable. Smart phones have larger power consumption though they have more functions, but the energy storage capacity of batteries cannot be increased unlimitedly such that the smart phones have shorter continuous service time. Usually, many smart phones need to be charged every one or two days, which degrades users' usage experience dramatically.

SUMMARY

In view of the problem that existing mobile communication terminals have large power consumption and short continuous service time, there is provided a mobile communication terminal which can take full advantage of energies and has long continuous service time.

According to one aspect of the present disclosure, there is provided a mobile communication terminal comprising: a magnetic field for generating magnetic field; an induction unit comprising at least one coil; a fixed unit and a motion unit which is movable relative to the fixed unit, wherein one of the magnetic field unit and the induction unit is arranged on the fixed unit, and the other is arranged on the motion unit; and an energy storage unit electrically connected to the induction unit and configured to store electrical energy generated by the induction unit.

In one exemplary embodiment, the mobile communication terminal further comprises a housing, wherein the fixed unit is arranged within the housing or is part of the housing; and the motion unit is arranged within the housing and can move in a manner of extraction from or insertion into the housing.

In one exemplary embodiment, the mobile communication terminal further comprises an operation unit connected to the motion unit and configured to grasp by a user to drive the motion unit.

In one exemplary embodiment, the mobile communication terminal further comprises a position limiting unit for limiting the motion range of the motion unit.

Further, in one exemplary embodiment, the position limiting unit is a position limitation clamping slot or a position limitation clamping block.

In one exemplary embodiment, the mobile communication terminal further comprises a reset unit connected to the motion unit and configured to reset the motion unit after the motion unit moves.

Further, in one exemplary embodiment, the reset unit is a reset spring.

In one exemplary embodiment, the mobile communication terminal further comprises a speaker, and the magnetic field unit is the magnet in the speaker.

In one exemplary embodiment, the mobile communication terminal further comprises a rectification circuit provided between the induction unit and the energy storage unit and configured to convert AC generated by the induction unit into DC to be transferred to the energy storage unit.

In one exemplary embodiment, the mobile communication terminal is a cell phone.

Since the mobile communication terminal of embodiments of the present disclosure has a magnet and an induction unit, when the motion unit moves, the coil of the induction unit can cut the magnetic force lines of the magnetic field of the magnet, and electrical energy is generated in the coil through electromagnetic induction to supply power for the mobile communication terminal. Therefore, the mobile communication terminal of the present disclosure can take full advantage of energy, has long continuous service time, and is convenient to use.

DETAILED DESCRIPTION

In order for those skilled in the art to better understand the technical solutions of the present disclosure, detailed descriptions are further made to specific implementations of the present disclosure in connection with the figures below.

First Embodiment

Figure 1:
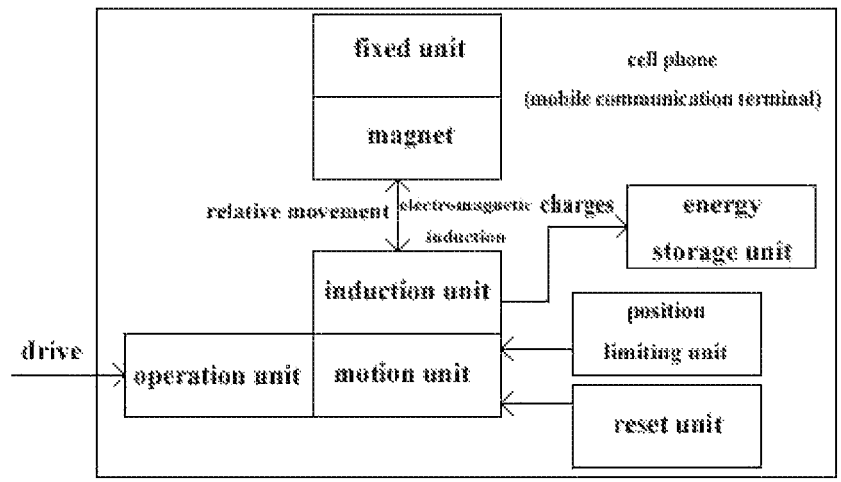
FIG. 1 is a schematic block diagram a structure of a mobile communication terminal according to a first embodiment of the present disclosure.

FIG. 1 illustrates a schematic block diagram of the constitutional structure of a mobile communication terminal according to the first embodiment of the present disclosure. As shown in FIG. 1, the embodiment provides a mobile communication terminal.

For example, the mobile communication terminal is a cell phone, and this embodiment is described by taking a cell phone as an example of the mobile communication terminal. However, it should be understood that the mobile communication terminal can also be other mobile devices with communication function, such as a tablet computer or the like.

The mobile communication terminal shown in FIG. 1 comprises known components such as a display panel 9, a speaker, a microphone, a processor, a circuit board, a housing 8, buttons, and so on. In addition, it also comprises a magnet 4, an induction unit, a fixed unit, a motion unit and an energy storage unit.

The magnet 4 can generate magnetic field. For example, since the cell phone usually has a speaker (power amplifier) and the speaker itself usually has a magnet 4, the magnet 4 in the speaker can be used directly. However, a specially added magnet 4 can alternatively be used. For example, an additional magnet 4 can be provided on the back cover 2 of the cell phone.

The induction unit comprises at least a coil 3. Of course, in order to improve the efficiency, it should include generally a plurality of coils 3 connected in series to cut the magnetic force lines to generate electrical energy.

Here, one of the magnet 4 and the induction unit is arranged on the fixed unit, and the other is arranged on the motion unit. The motion unit is movable relative to the fixed unit. For example, it is possible that the magnet 4 is arranged on the fixed unit (for example, the magnet 4 is adhered onto the back cover 2 of the cell phone) and the induction unit is arranged on the motion unit (for example, the coil is wound on the plate component 1 described later) and this embodiment takes such a manner as an example. However, obviously, it is also possible that the induction unit is arranged on the fixed unit, and the magnet 4 is arranged on the motion unit.

In other words, the mobile communication terminal of this embodiment further comprises a fixed unit that is relatively fixed, a motion unit that is movable relative to the fixed unit, and the magnet 4 and the induction unit are arranged on the fixed unit and the motion unit, respectively. Therefore, as long as the user drives the motion unit to move (that is, let relative movement between the motion unit and the fixed unit generate), relative movement occurs between the magnet 4 and the induction unit, such that the coil 3 of the induction unit will cut magnetic force lines of the magnetic field of the magnet 4 and current is generated through electromagnetic induction. The current can in turn supply power for other components (such as the processors, the display panel 9, the speaker, and so on) of the mobile communication terminal. As such, it is possible to both take full advantage of energy and extend the continuous service time of the mobile communication terminal.

The energy storage unit is electrically connected to the induction unit and is used to store electrical energy generated by the induction unit.

The reason for providing the energy storage unit is that the user is obviously not able to drive the motion unit to supply provide power for the mobile communication terminal at any time, and thus the electrical energy generated during the movement of the motion unit needs to be stored for use when it is needed. For example, the energy storage unit can be the original battery of the mobile communication terminal, that is, the induction unit can charge the battery at any time. Alternatively, the energy storage unit can be an additional auxiliary battery, in other words, the mobile communication terminal is mainly powered by its original battery, but as a complement, the auxiliary battery can supply power for the mobile communication terminal when the original battery has insufficient power, or supply power for some low power consumption components.

Alternatively, the mobile communication terminal further comprises a rectification circuit provided between the induction unit and the energy storage unit for converting AC electricity generated by the induction unit into DC electricity to be transferred to the energy storage unit.

Obviously, the movement of the motion unit relative to the fixed unit must be "reciprocating" type. Therefore, what is generated in the induction unit is usually AC electricity which is usually not able to be used by the mobile communication terminal directly and cannot be used in charging directly. Therefore, a rectification circuit can be provided between the induction unit and the energy storage unit such as to convert the AC electricity into DC electricity to charge the energy storage unit. The rectification circuit can be a known form such as a bridge rectification circuit or the like, which will not be described in detail here.

The forms of the fixed unit and the motion unit will be described in detail below.

Figure 2:
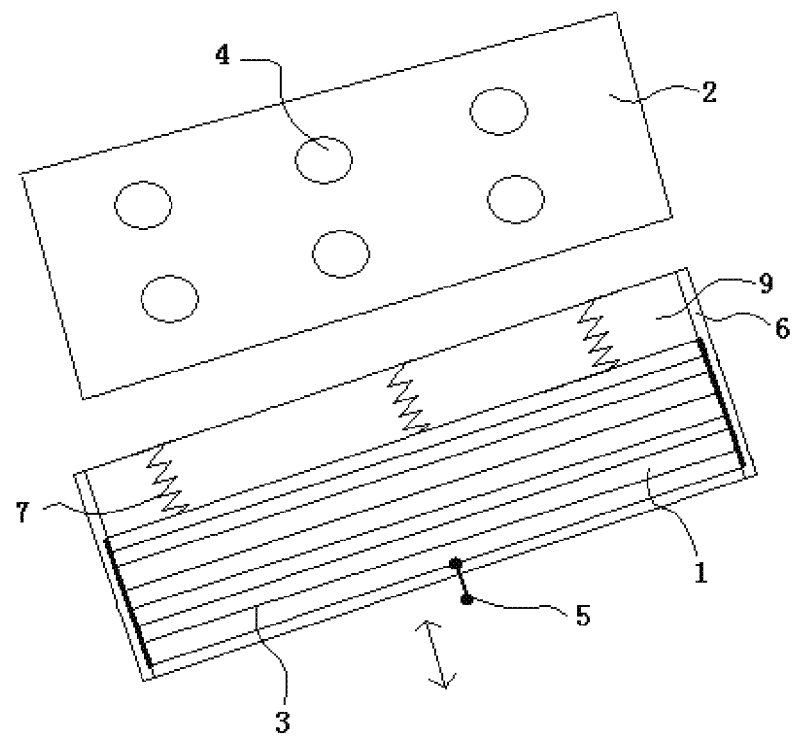
FIG. 2 is a schematic diagram of a structure of part components of the mobile communication terminal according to the first embodiment of the present disclosure.
Figure 3:
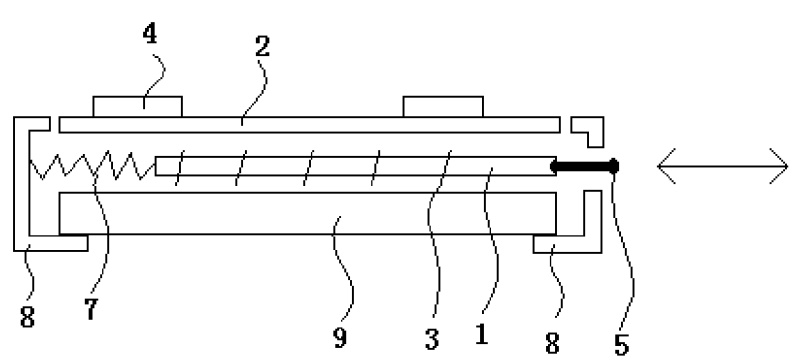
FIG. 3 is a schematic diagram of a cross-sectional structure of the mobile communication terminal according to the first embodiment of the present disclosure.

FIG. 2 schematically illustrates a structure of part components of the mobile communication terminal according to the first embodiment of the present disclosure. FIG. 3 schematically illustrates a cross sectional structure diagram of the mobile communication terminal according to the first embodiment of the present disclosure. As shown in FIG. 2 and FIG. 3, the mobile communication terminal of the embodiment further comprises a housing 8, and the fixed unit is arranged within the housing 8 or is part of the housing 8. The motion unit is arranged within the housing 8 and can move in a manner of extraction from or insertion into the housing 8.

In other words, the mobile communication terminal of this embodiment such as a cell phone has a conventional housing 8. The fixed unit is arranged within the housing 8 or is part of the housing 8. The motion unit is "inserted" in the housing 8, and thus its movement manner is "extraction from or insertion into" the housing 8. That is, the motion unit can be a form similar to a "drawer". The above forms of the fixed unit and the motion unit can ensure that the motion unit cannot be seen when not charging such that the appearance of the cell phone is relatively clean and beautiful, while the movement procedure is simple and easy to realize when charging.

For example, as shown in FIG. 2 and FIG. 3, the fixed unit can be a back cover 2 (which is part of the housing 8) of the cell phone, the magnet 4 is adhered onto the back cover 2, the motion unit is the plate component 1 disposed between the back cover 2 and the display panel 9, and the coil 3 is wound on the plate component 1 (of course, the coil 3 can also be adhered onto the plate component 1). The plate component 1 is located within the housing 8 of the cell phone when not charging and can be drawn out of and inserted into the housing 8 in the direction of the arrow, such that current is generated in the coil 3 during the reciprocating movement to charge the energy storage unit.

Of course, it is also feasible that the motion unit moves relative to the fixed unit in other manners. For example, the motion unit can also perform movements such as "rotation", "turnover" or the like relative to the fixed unit so far as achieve the defect that the coil 3 cuts the magnetic force lines, and it is not described in detail here.

For example, as shown in FIG. 2 and FIG. 3, the mobile communication terminal further comprises an operation unit connected to the motion unit for a user to grasp to drive the motion unit to move.

In other words, in order to facilitate the user to drive the motion unit, it is possible to arrange an operation rod 5, a pulling ring or the like as the operation unit such that the user can grasp the operation rod 5 to bring the motion unit to move.

Alternatively, as shown in FIG. 2, the mobile communication terminal of the embodiment further comprise a position limiting unit for limiting the motion range of the motion unit. Further, the position limiting unit can be a position limitation clamping slot 6 or a position limitation clamping block.

In other words, in order to prevent the motion unit from getting off, being damaged or the like due to too much movement, a position limiting unit can be arranged to limit the movement range of the motion unit. For example, the limitation unit can be forms of a position limitation clamping slot 6, a position limitation clamping block or the like. That is, when the motion unit moves to a certain position, the position limitation clamping slot 6 or the position limitation clamping block can "lock" the motion unit to prevent it from moving any further.

Alternatively, as shown in FIG. 2, the mobile communication terminal of the embodiment further comprises a reset unit connected to the motion unit and configured to reset the motion unit after the motion unit moves. For example, the reset unit is a reset spring 7.

In other words, a reset unit can be provided to automatically restore the motion unit to its original position after the motion unit moves (for example, after the motion unit is "drawn out of" the housing 8) to simplify the user's operation. For example, the reset unit can be a reset spring 7 such that the plate component 1 can be "pulled back" to its original position. Of course, the reset spring 7 can further function as the above "position limiting unit" at the same time, which will not be described in detail here.

It can be understood that the above implementations are only exemplary implementations adopted for illustrating the principles of the present disclosure, but the present disclosure is not limited to them. Those skilled in the art can make various variations and improvements without departing from the spirit and essence of the present disclosure. These variations and improvements are also intended to be incorporated within the protection scope of the present disclosure.

The present application claims the priority of Chinese Patent Application No. 201310705639.5 filed on Dec. 19, 2013, entire content of which is incorporated as part of the present invention by reference.

What is claimed is:

1. A mobile communication terminal comprising:
   a magnetic field unit for generating magnetic field;
   an induction unit comprising at least one coil;
   a fixed unit and a motion unit which is movable relative to the fixed unit, wherein one of the magnetic field unit and the induction unit is arranged on the fixed unit, and the other is arranged on the motion unit; and
   an energy storage unit electrically connected to the induction unit and configured to store electrical energy generated by the induction unit;
   wherein the mobile communication terminal further comprises a speaker with a magnet, and the magnet in the speaker is used as the magnetic field unit for generating the magnetic field.

2. The mobile communication terminal according to claim 1, further comprising a housing, wherein
   the fixed unit is arranged within the housing or is part of the housing; and
   the motion unit is arranged within the housing and can move in a manner of extraction from or insertion into the housing.

3. The mobile communication terminal according to claim 1, further comprising:
   an operation unit connected to the motion unit and configured to grasp by a user to drive the motion unit.

4. The mobile communication terminal according to claim 1, further comprising:
   a position limiting unit for limiting the motion range of the motion unit.

5. The mobile communication terminal according to claim 4, wherein
   the position limiting unit is a position limitation clamping slot or a position limitation clamping block.

6. The mobile communication terminal according to claim 1, further comprising:
   a reset unit connected to the motion unit and configured to reset the motion unit after the motion unit moves.

7. The mobile communication terminal according to claim 6, wherein
   the reset unit is a reset spring,
   the magnetic field unit is the magnet in the speaker.

8. The mobile communication terminal according to claim 1, further comprising:
   a rectification circuit arranged between the induction unit and the energy storage unit and configured to convert AC generated by the induction unit into DC to be transferred to the energy storage unit.

9. The mobile communication terminal according to claim 8, further comprising a housing, wherein
   the fixed unit is arranged within the housing or is part of the housing; and
   the motion unit is arranged within the housing and can move in a manner of extraction from or insertion into the housing.

10. The mobile communication terminal according to claim 8, further comprising:
    an operation unit connected to the motion unit and configured to grasp by a user to drive the motion unit.

11. The mobile communication terminal according to claim 8, further comprising:
    a position limiting unit for limiting the motion range of the motion unit.

12. The mobile communication terminal according to claim 11, wherein
    the position limiting unit is a position limitation clamping slot or a position limitation clamping block.

13. The mobile communication terminal according to claim 8, further comprising:
    a reset unit connected to the motion unit and configured to reset the motion unit after the motion unit moves.

14. The mobile communication terminal according to claim 1, wherein the mobile communication terminal is a cell phone.

15. The mobile communication terminal according to claim 1, further comprising a housing, wherein
    the fixed unit is arranged within the housing or is part of the housing; and
    the motion unit is arranged within the housing and can move in a manner of extraction from or insertion into the housing.

16. The mobile communication terminal according to claim 1, further comprising:
    an operation unit connected to the motion unit and configured to grasp by a user to drive the motion unit.

17. The mobile communication terminal according to claim 1, further comprising:
    a position limiting unit for limiting the motion range of the motion unit.

18. The mobile communication terminal according to claim 17, wherein
    the position limiting unit is a position limitation clamping slot or a position limitation clamping block.

19. The mobile communication terminal according to claim 1, further comprising:

a reset unit connected to the motion unit and configured to reset the motion unit after the motion unit moves.

* * * * *